(12) United States Patent
Allezard et al.

(10) Patent No.: US 9,098,774 B2
(45) Date of Patent: Aug. 4, 2015

(54) METHOD FOR DETECTION OF TARGETS IN STEREOSCOPIC IMAGES

(75) Inventors: Nicolas Allezard, Paris (FR); Sabri Bayoudh, Montrouge (FR); Patrick Sayd, Villebon sur Yvette (FR); Laurent Lucat, Fay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 491 days.

(21) Appl. No.: 13/640,023

(22) PCT Filed: Apr. 11, 2011

(86) PCT No.: PCT/EP2011/055591
§ 371 (c)(1),
(2), (4) Date: Nov. 6, 2012

(87) PCT Pub. No.: WO2011/124719
PCT Pub. Date: Oct. 13, 2011

(65) Prior Publication Data
US 2013/0057658 A1   Mar. 7, 2013

(30) Foreign Application Priority Data

Apr. 9, 2010   (FR) ...................... 10 52721

(51) Int. Cl.
*G06K 9/62* (2006.01)
*G06K 9/66* (2006.01)
(Continued)

(52) U.S. Cl.
CPC .......... *G06K 9/6227* (2013.01); *G06K 9/00798* (2013.01); *G06K 9/00805* (2013.01); *G06K 9/209* (2013.01)

(58) Field of Classification Search
CPC .......... G06K 9/00201; G06K 9/00208; G06K 9/3241; G06K 9/00577; G06K 9/00624; G06K 9/00664
USPC ......... 382/100, 103, 118, 154, 157, 159, 165, 382/224, 225, 209, 216
See application file for complete search history.

(56) References Cited

U.S. PATENT DOCUMENTS 6,788,809 B1   9/2004  Grzeszczuk et al.
2008/0310678 A1  12/2008  Ogasawara
2010/0014781 A1*  1/2010  Liu et al. ...................... 382/285

FOREIGN PATENT DOCUMENTS

WO   97/21188 B1   6/1997

OTHER PUBLICATIONS

Labayrade, Raphael, Didier Aubert, and J-P. Tarel. "Real time obstacle detection in stereovision on non flat road geometry through "v-disparity" representation." Intelligent Vehicle Symposium, 2002. IEEE. vol. 2. IEEE, 2002.*
(Continued)

*Primary Examiner* — Sath V Perungavoor
*Assistant Examiner* — Clifford Hilaire
(74) *Attorney, Agent, or Firm* — Baker & Hostetler LLP

(57) ABSTRACT

A method for detection of a target present on at least two images of the same scene captured by separate cameras comprises a prior step for learning about targets under setup conditions and further comprises, under conditions of use, a simultaneous classification step for objects present on the images, the target being said to be detected as soon as an object is classified as being one of the targets learned during the learning step. The classification step includes a step for adapting at least one of the images to the setup conditions under which the learning step took place. Application: surveillance, assistance and safety based on stereoscopic images.

6 Claims, 3 Drawing Sheets

(51) Int. Cl.
*G06K 9/64* (2006.01)
*G06K 9/00* (2006.01)
*G06K 9/20* (2006.01)

(56) References Cited

OTHER PUBLICATIONS

Raphael Labayrade, et al., "Real Time Obstacle Detection in Stereovision on Non Flat Road Geometry Through "V-disparity" Representation", Intelligent Vehicle Symposium, Jun. 17-21, 2002, pp. 646-651, vol. 2, IEEE, Piscataway, NJ, USA, XP010635896.

Amnon Shashua, et al., "The Quotient Image: Class-Based Re-Rendering and Recognition with Varying Illuminations", IEEE Transactions on Pattern Analysis and Machine Intelligence, Feb. 1, 2001, pp. 129-139, vol. 23, No. 2, IEEE Service Center, Los Alamitos, CA, USA, XP001005759.

W. Zhao, et al., "Face Recognition: A Literature Survey", ACM Computing Surveys, Dec. 1, 2003, pp. 399-459, vol. 35, No. 4, ACM, New York, NY, USA, XP001156024.

Andreas Wedel, et al., "B-Spline Modeling of Road Surfaces with an Application to Free-Space Estimation", IEEE Transactions on Intelligent Transportation Systems, Dec. 1, 2009, pp. 572-583, vol. 10, No. 4, IEEE Service Center, Piscataway, NJ, USA, XP011282306.

* cited by examiner

METHOD FOR DETECTION OF TARGETS IN STEREOSCOPIC IMAGES

CROSS-REFERENCE TO RELATED APPLICATIONS

This application is a National Stage of International patent application PCT/EP2011/055591, filed on Apr. 4, 2011, which claims priority to foreign French patent application No. FR 1052721, filed on Apr. 9, 2010, the disclosures of which are incorporated by reference in their entirety.

FIELD OF THE INVENTION

The present invention relates to a method for detection of targets in stereoscopic images. It is applicable in any field using cameras for detecting objects. These can for example be surveillance, assistance, or safety applications onboard a vehicle.

BACKGROUND

The general issue is to search within images for the presence of targets of various types, whether these be objects or people, the targets exhibiting certain characteristics conforming to a model. For example, this may be a parametric model, such as a ratio between width and height which must be equal to a given value A or a three-dimensional model of the CAD type.

Such a method for detection of targets based on a model becomes difficult to implement in the case of a wide variability in appearance of the targets. For example, the appearance of a person can vary widely depending on their posture or their clothes. The method may even become impossible to implement. For example, the owner of a car park will have great difficulty in detecting trucks as long as he does not possess CAD models of the various types of truck, given that the truck manufacturers do not distribute CAD models of their trucks.

In these cases where the modeling of the targets proves to be difficult or even impossible, a known solution consists in implementing a step of OFF-LINE statistical learning, in other words prior to the use of the detection system, and an ON-LINE classification step, in other words simultaneously with the use of the detection system. In fact, the classification step forms an integral part of the process of detection: if a system for detecting pedestrians is considered, a detection occurs as soon as a target has been classified as "pedestrian".

The off-line statistical learning step consists in learning to recognize targets thanks to an algorithm which automatically extracts the most relevant parameters of the targets, in order to discriminate it with respect to the other elements that may be present on the images. These discriminating parameters are used later during the simultaneous classification step. The simultaneous classification step is carried out in real time on the most recent images supplied by the cameras. However, the conditions of use during the simultaneous classification step are not necessarily exactly the same as the setup conditions during the off-line learning step. This can be due to factors specific to the detection system. Indeed, the height and/or the inclination of the cameras can vary from one installation to another, for example owing to a variation of height and/or of inclination of the support on which they are fixed. Notably, the angle of inclination of fixed cameras on the front of a vehicle changes according to the loading of the vehicle. But this may also be due to factors external to the detection system. Thus, if a system for detecting pedestrians is considered, the learning step can be carried out with people standing up and cameras mounted truly horizontally on a car. However, on a slope or a passing bump, people have a tendency to lean in order to compensate for the slope, such that their appearance ends up inclined with respect to the learning step. Whether due to factors specific or external to the system, this results in a clear degradation of the performance, notably cases of non-detections, the target observed during the classification step no longer having exactly the same appearance as during the learning step.

One conventional solution consists in carrying out a re-learning step for each configuration of use. However, this solution has many drawbacks: it is notably long and non-automatable and requires a real expertise together with ad hoc tools, which excludes the majority of users. Another conventional solution consists in changing the detection thresholds in order to pick up the undetected targets. One major drawback of this solution is the increase in the number of false alarms. The number of false alarms can be reduced by adding post-processing steps, notably a step for tracking targets. However, the complexity of the software implemented is then much higher and does not guarantee to be able to correct all the errors.

The US patent application published under No US 2008/0310678 A1 discloses a device for detecting pedestrians. This device implements a learning step and a classification step based, amongst other things, on a model of pedestrian appearance. This device has the aforementioned drawbacks, resulting in an expected significant number of false alarms, owing to the variability of the appearance of the pedestrians, uncompensated by a correction system taking into account the differences in configuration between learning and ON-LINE detection.

The article entitled "B-spline modeling of road surfaces with an application to free-space estimation" (A. Wedel et al) discloses a method consisting in representing the surface of a road by a B-spline and in measuring V-disparities in order to detect the obstacles on the road. One major drawback of such a method using a parametric model by B-spline is that it can easily become defective if reality is substantially different from the model. Another drawback of such a method based on the V-disparity is that it does not take into account the variations along the transverse axis and that it is consequently maladapted to generic traffic contexts, in other words other than the road.

The article entitled "Real Time Obstacle Detection in Stereovision on Non Flat Road Geometry Through V-disparity Representation" (R. Labayrade et al) discloses a method consisting in modeling, using stereoscopic images, a road together with the obstacles on the road. One drawback of this method is that it does not allow the obstacles to be classified. Moreover, based on the assumption that the road does not exhibit any oblique inclination with respect to the reference of the camera, this method is unreliable in a generic context of an uncompacted or unsurfaced road.

SUMMARY OF THE INVENTION

The aim of the invention is notably to limit the number of missed detections without however increasing the number of false alarms, even in a case of significant variability between the conditions of use and the learning conditions. For this purpose, the invention provides a step for image rectification aimed at bringing the images observed by the cameras during use into a configuration close to the configuration during the learning phase, this rectification reducing or even cancelling the geometric distortions of perspective, in such a manner as to facilitate the correspondence between the targets learnt during the learning phase and those observed during use. For this purpose, the subject of the invention is a method for detection of a target present on at least two images of the same scene captured by separate cameras. The method comprises a prior step of learning about targets under setup conditions, and also under conditions of use, a simultaneous classification step for objects present on the images, the target being said to be detected as soon as an object is classified as being one of the targets learnt during the learning step. The classification step includes a step of adaptation of at least one of the images to the setup conditions under which the learning step took place.

In one preferred embodiment, the step of adaptation of the image can include a step of rectification of the image, in such a manner that the plane of the corrected image is parallel to the plane of the images used for the learning step.

Advantageously, the step of adaptation of the image can then include a step of rectification of a map of disparity between the two images, in such a manner that the rectified map takes the rectification of the image into account.

The rectification steps depending on rectification parameters, said parameters can advantageously be adjustable.

For example, the rectification parameters can be adjusted upon request.

In a preferred embodiment, the rectification parameters can be closed-loop controlled onto an angle $\alpha$ of inclination of the axis of the cameras with respect to the ground in a vertical plane.

For example, the angle $\alpha$ can be estimated from the slope of a straight line in a collection of histograms of disparities.

For example, the angle $\alpha$ can be estimated from a vertical offset between a position of a region of interest detected on one of the images, the target being likely to be located in said region, and a position on said image where the target is effectively detected.

The angle $\alpha$ can be estimated according to $\alpha=F(y-y_0)$, where F is a function.

The angle $\alpha$ can be estimated in an incremental fashion according to $\alpha_{n+1}=\alpha_n+\lambda*F(y-y_0)$, where n is an integer, F is a function and $\lambda$ is a rate of learning.

For example, F can be the identity function or the sign function which associates $-1$ with any real x, if x is negative, associates 0 if x=0, and associates $-1$ if x is positive.

The present invention has the further main advantage that it limits the need to use external components, which allows the costs to be reduced and the integration to be facilitated. Moreover, another advantage of a device according to the invention is that it automatically adapts itself to any change in the conditions of use, in both the short term and in the medium term.

BRIEF DESCRIPTION OF THE DRAWINGS

Other features and advantages of the invention will become apparent with the aid of the description that follows, presented with regard to the appended drawings which show.

DETAILED DESCRIPTION

Figure 1A:
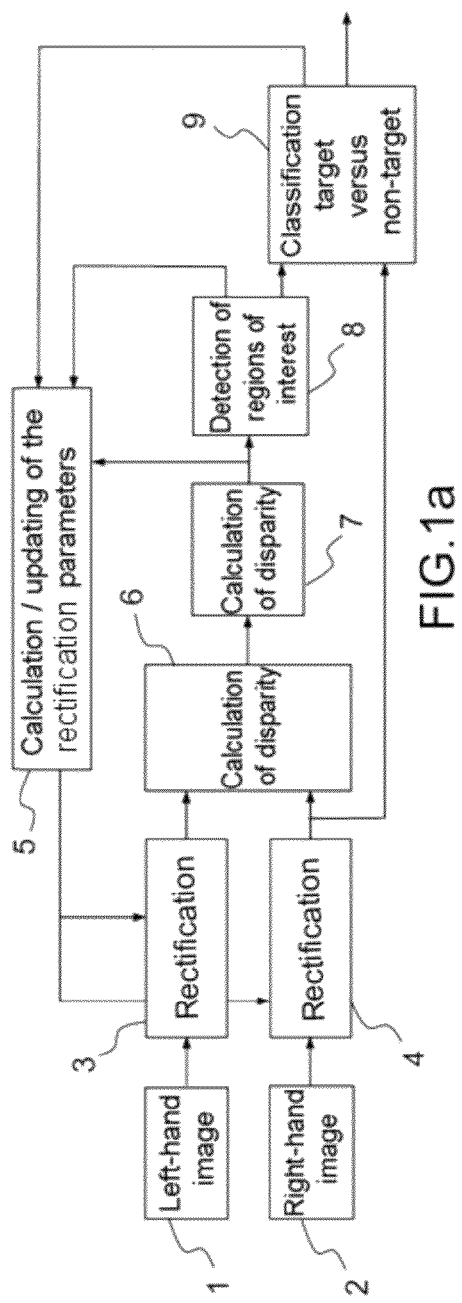
FIGS. 1a and 1b, with a block diagram and a corrected image, a first exemplary embodiment according to the invention.

FIG. 1a illustrates, with a block diagram, a first exemplary embodiment of the invention by means of a chain for detection by conventional statistical classification notably comprising two cameras 1 and 2, a module 6 for calculating disparities (or depths) between the images from the camera 1 and the images from the camera 2, a module 7 for managing the map of disparity constructed from the values of disparity calculated by the module 6, a module 8 for detection of the regions of interest and a module 9 for classification as "target" or "non-target". A gray scale can correspond to each interval of values of disparity (or of 3D depth) on a pixel, which is why the terms 'map' or 'image' of disparity (or 3D depth) will be referred to interchangeably hereinbelow. The disparity is the difference in pixel position between two images for the same observed point in space. The disparity is firstly calculated, which can be transformed into 3D depth.

The invention includes the addition of the modules 3 and 4 for image rectification, which apply a projective transformation onto images coming respectively from the camera 1 disposed on the left of a vehicle and from the camera 2 disposed on the right of the vehicle, such that these images are geometrically rectified.

Figure 1B:

The image on the left in FIG. 1b is one example of image coming from the camera 1 or 2 prior to rectification, this same image being shown after rectification on the right in FIG. 1b.

On the left-hand image before rectification, a person standing up, in other words substantially vertical, clearly appears as being inclined forward. In the top part of the image, the head of the person appears shrunken, whereas in the bottom part of the image, the feet of the person appear magnified.

In the right-hand image after rectification, the person appears completely vertical. In fact, it is the plane of the image which has been rectified in such a manner as to be parallel to the plane of the images used during the learning phase. The plane of an image here runs like any plane perpendicular to the axis of the camera having captured the image. It should be noted that the parameters of the image, notably its luminance, are not directly affected by the rectification, except for a few pixels, for example pixels from the bottom which are encompassed in the feet.

Figure 2A:
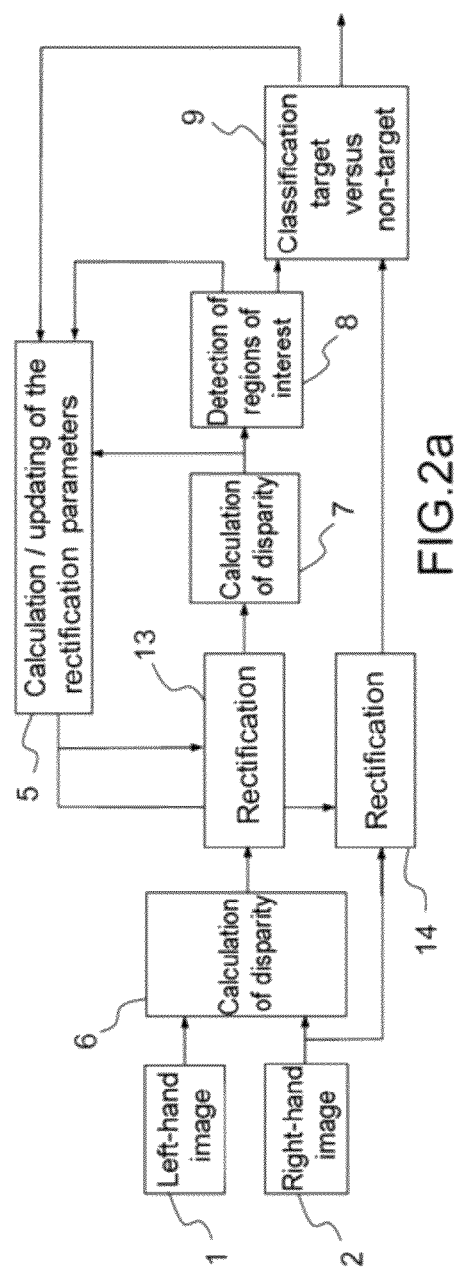
FIGS. 2a and 2b, with a block diagram and a corrected map of disparity, a second exemplary embodiment according to the invention.

FIG. 2a illustrates, with a block diagram, a second exemplary embodiment of the invention thanks to a module 14 for image rectification and a module 13 for disparity map rectification. The module 14 applies a projective transformation onto the images coming from the camera 2, in other words it changes the orientation of the plane of the images coming from the camera 2 as previously explained. Yet, a change in orientation of the plane of an image coming from the camera 2 is accompanied by a change in distance with respect to the optical center of the camera 2, hence by a change in values of disparity in the map of disparity between the images coming from the cameras 1 and 2, including for the pixels of the image which do not change region of assignment such as the pixels which were considered in the foreground before rectification and which remain there after rectification. This is why the module 13 applies a correction to the values of disparity in the map of disparity between the images coming from the cameras 1 and 2. It should be noted that, in this second embodiment, although the rectification of the image comprises approximations, the angle to be rectified only being known with a limited precision, the latter does not interfere with the calculation of the disparity which however requires a high precision.

Figure 2B:
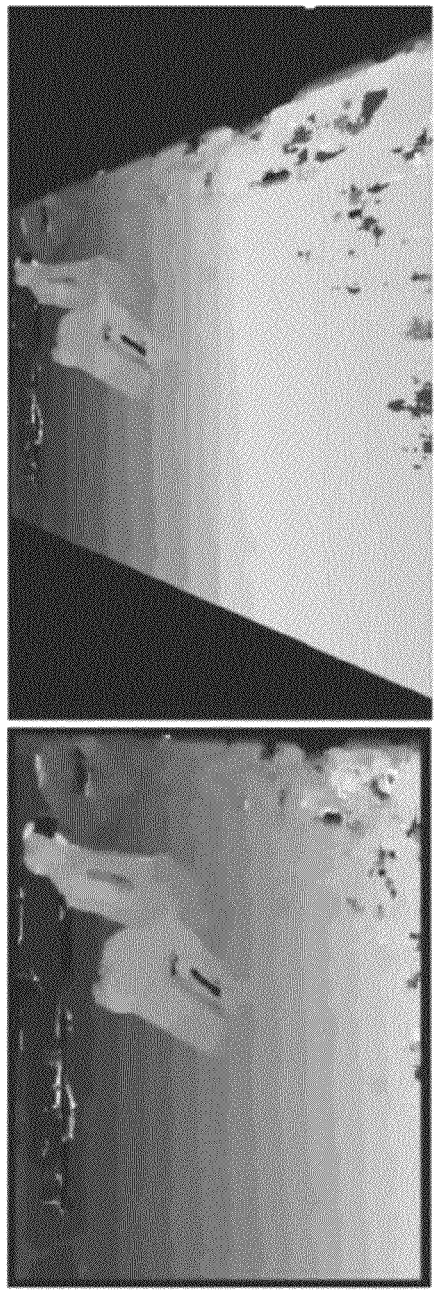

The map on the left in FIG. 2b is one example, in gray scale, of a map of disparity between the images coming from the cameras 1 and 2 before rectification, this same map being shown after rectification on the right in FIG. 2b. Aside from the geometrical corrections, the correction to the values of disparity, illustrated by differences in gray scale with respect to the image with uncorrected disparity on the left, can indeed be observed on the right.

In one preferred embodiment, the rectification parameters can be adjusted thanks to a module 5 illustrated in FIGS. 1a and 2a. Indeed, even if it is possible to specify the parameters thanks to a physical measurement, in other words by measuring the height of positioning of the cameras 1 and 2, by measuring their angle of inclination in a vertical plane with respect to the ground, then by injecting once and for all this information into the rectification modules 3, 4, 13 and 14, it is however preferable to update these parameters from time to time.

This may for example take the form of a single recalculation, or upon request, based on a calibration procedure. Additional sensors can then provide the angle of inclination in a vertical plane of the cameras 1 and 2 with respect to the vertical.

Nevertheless, it is preferable to provide a closed-loop control of the rectification parameters from the data coming directly from the detection chain. First of all, it is then no longer necessary to use external components, which allows the costs to be reduced and the integration of the system to be facilitated. In addition, a regular and frequent adjustment of the parameters allows the system to adapt to any change in the medium term, such as the loading of the vehicle which modifies its inclination with respect to the ground and hence the inclination of the cameras 1 and 2. But, above all, the regular and frequent adjustment of the parameters allows the system to adapt to any more ephemeral interference, such as modifications in slopes of the terrain or even bumps. The closed-loop control of the parameters can be carried out in several ways, as illustrated by FIGS. 1a and 2a.

Figure 3:
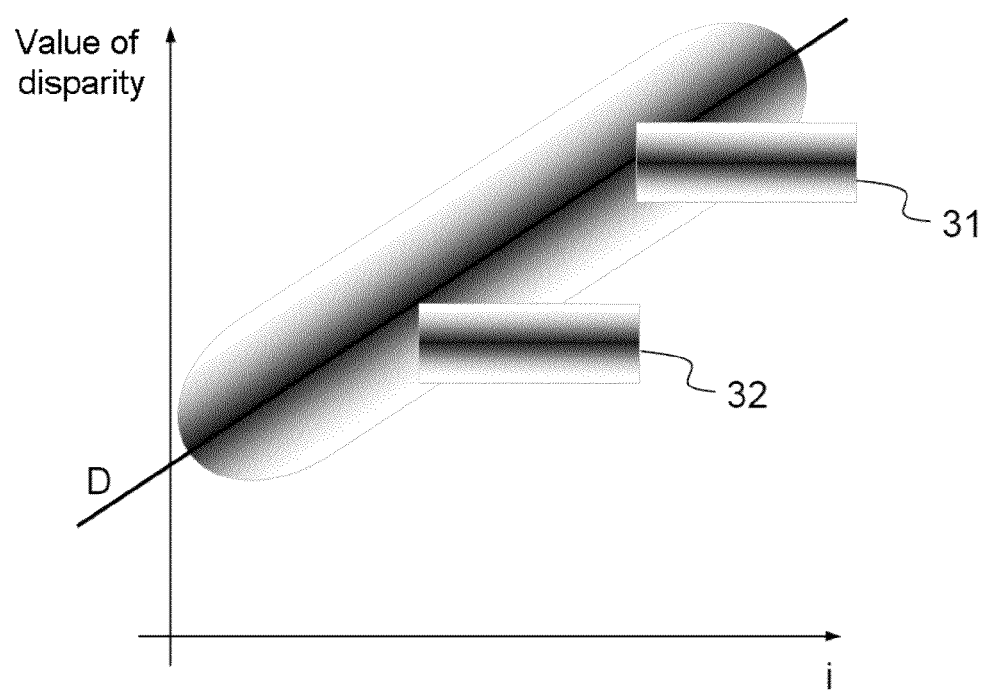
FIG. 3, with a histogram, one example of distribution of points of disparity around a straight line.

The module 5 can for example adjust the rectification parameters based on the map of disparity managed by the module 7, as illustrated in FIGS. 1a and 2a by an arrow going from the module 7 to the module 5. Indeed, it is possible to estimate, using the image of disparity, the inclination in a vertical plane of the axis of the cameras 1 and 2 with respect to the ground. For this purpose, histograms of the disparities can be constructed as illustrated by FIG. 3. In FIG. 3, the horizontal axis of the abscissa represents the indices of row i of the pixels (i, j) of the image and the vertical axis of the ordinates represents the k possible values of disparity on a pixel. For each value of abscissa corresponding to a row i of pixels of the map of disparity, the histogram of the disparity (or of the 3D depth) is constructed vertically along said row i of pixels. Thus, vertically to a value of index i are located as many points as there are possible values of the disparity (or of the 3D depth), in other words k possible values. Indeed, it is the histogram of the values which is presented vertically, not the values themselves. For example, if the depth can go from 0 to 20 meters sampled every 10 centimeters, that makes k=200 points vertically, whatever the number of pixels j on the row i. The number of pixels related to each discretized value of depth corresponds to a specific gray scale of the point. Ideally, the i×k points are distributed around an inclined straight line D, as illustrated in FIG. 3. The slope of this straight line is directly linked to the angle of inclination in a vertical plane between the ground and the axis of the cameras 1 and 2, which gives the vertical inclination of the cameras 1 and 2 in the case of a flat ground. Horizontal elements 31 and 32, which may be observed in FIG. 3, then correspond to vertical objects, which could be pedestrians.

The module 5 can also adjust the rectification parameters based on the positions of the regions of interest detected by the module 8 and on the targets detected by the module 9, as illustrated in FIGS. 1a and 2a by an arrow going from the module 8 to the module 5 and by an arrow going from the module 9 to the module 5. Indeed, starting from the map of disparity managed by the module 7, positions of regions of interest can be extracted, firstly three-dimensional as (x, y, z), then two-dimensional as (x, y) by re-projection into the image, these regions of interest being likely to contain targets. In the case of a vertical inclination of the camera with respect to the inclination used during the learning, the re-projection (x, y) of the position of the targets is offset vertically with respect to reality. These offset positions (x, y) are transmitted to the classification module 9 for analysis, which applies its analysis over a window wider than the simple region (x, y), including notably the real position $(x_0, y_0)$, hitherto unknown, in order to compensate for the uncertainties of detection. If the classification module 9 works well and there is indeed a "true target", the module 9 finds this target really positioned at $(x_0, y_0)$. The difference between y and $y_0$ may then be used for analyzing the bias of the detection, which is linked to the vertical inclination of the camera. In order to estimate this bias, the difference (y−y0) may be converted into an angle α of inclination in a vertical plane according to a formula of the type $\alpha = F(y-y_0)$, where F denotes a function that is adjustable according to needs, for example the identity function or the sign function. This bias may also be estimated in an incremental fashion according to a formula of the type $\alpha_{n+1} = \alpha_n + \lambda * F(y-y_0)$, where λ denotes a rate of learning to be specified to provide a compromise between stability and reactivity. In order to make the method more robust, it is possible to calculate a mean correction to be applied, based on all of the differences between y and $y_0$ for all of the targets detected in the image. Indeed, a difference systematically of the same sign and of amplitude comparable between y and $y_0$ for all of the targets of the image reinforces the probability that the difference observed really does reveal the presence of an error in angle rather than being the consequence of local noise.

In one preferred embodiment, like the embodiments illustrated in FIGS. 1a and 2a, the module 5 can adjust the rectification parameters by combining the two methods previously described, in other words based on the map of disparity and based on the positions of the regions of interest and of the targets detected.

The invention previously described is applicable to all kinds of applications for recognition of targets, as long as they are based on the use of video sensors and the use of a statistical classification method comprising a prior learning phase followed by a simultaneous detection phase. These can for example be surveillance applications, such as the visual recognition of badges, the detection or the classification of objects such as abandoned packages in airports, the detection or the classification of vehicles. It can also be used in assistance and safety applications, such as the detection of pedestrians or road information signs, for equipping cars or any other type of mobile craft.

The invention claimed is:

1. A method for detection of a target amongst a plurality of possible targets, the target being present on at least two images of the same scene captured by separate cameras, the method comprising:
    under setup conditions, a prior step of learning about possible targets, the axis of the cameras showing a first angle of inclination in a vertical plane with respect to the ground, and;
    under conditions of use, a classification step for objects present on the images, the target being detected as soon as an object is classified as being one of the targets learnt during the learning step;

the classification step including a step of rectification of one of the images, in such a manner that the plane of the rectified image is parallel to the plane of the images used for the learning step, and a step of rectification of a map of disparity between the two images, in such a manner that the rectified map takes the rectification of the image into account, the rectification steps depending on a second angle $\alpha$ of inclination of the axis of the cameras with respect to the ground in a vertical plane, the second angle $\alpha$ being estimated from a vertical offset $y-y0$ between a position $(x, y)$ of a region of interest detected on one of the images from the map of disparity, the target being likely to be located in said region, and a position $(x0, y0)$ on said image where the target is effectively detected.

2. The method as claimed in claim 1, wherein the second angle $\alpha$ is estimated according to $\alpha=F(y-y_0)$, where F is a function.

3. The method as claimed in claim 2, wherein F is the identity function or the sign function, which associates −1 with any real x, if x is negative, associates 0 if x=0, and associates +1 if x is positive.

4. The method as claimed in claim 1, wherein the second angle $\alpha$ is estimated in an incremental fashion according to $\alpha_{n+1}=\alpha_n+\lambda*F(y-y_0)$, where n is an integer, F is a function and $\lambda$ is a rate of learning.

5. The method as claimed in claim 4, wherein F is the identity function or the sign function, which associates −1 with any real x, if x is negative, associates 0 if x=0, and associates +1 if x is positive.

6. The method of claim 1, wherein the second angle $\alpha$ is estimated from the slope of a straight line in a collection of histograms of disparities.

* * * * *